July 4, 1967
H. W. BROWN
3,329,842
SPEED CONTROLLERS FOR PORTABLE DEVICES
Filed May 11, 1965
3 Sheets-Sheet 1
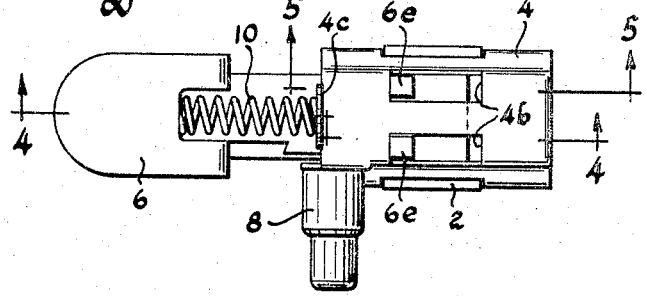
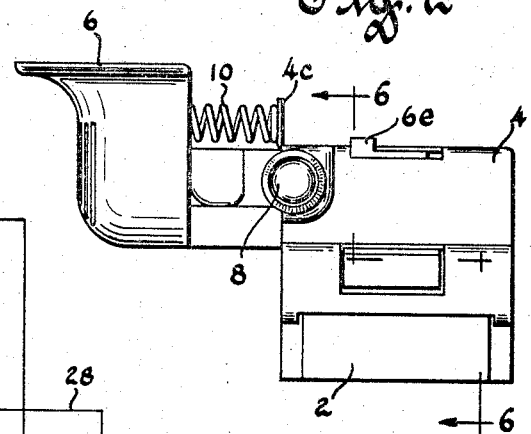
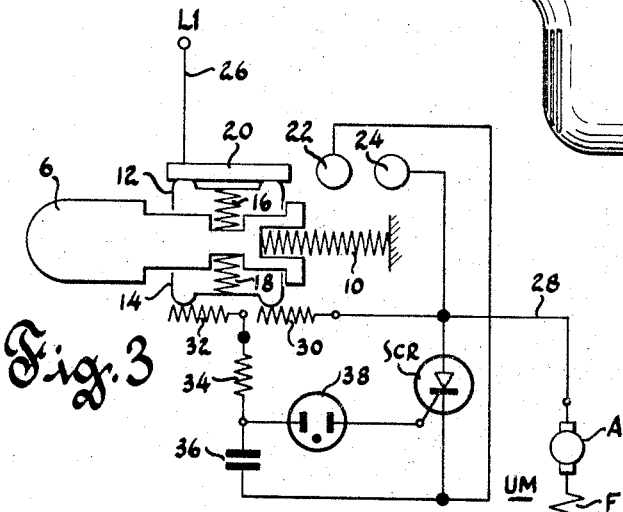
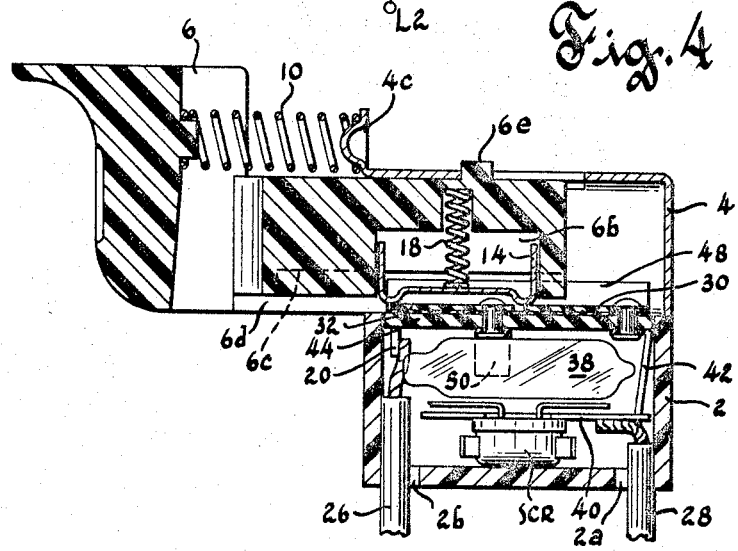

July 4, 1967  H. W. BROWN  3,329,842
SPEED CONTROLLERS FOR PORTABLE DEVICES
Filed May 11, 1965  3 Sheets-Sheet 2
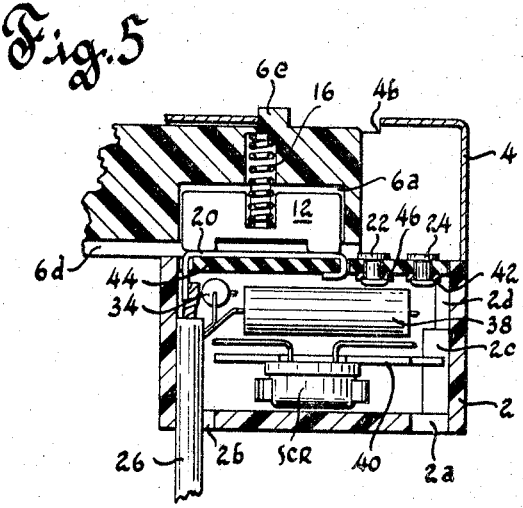
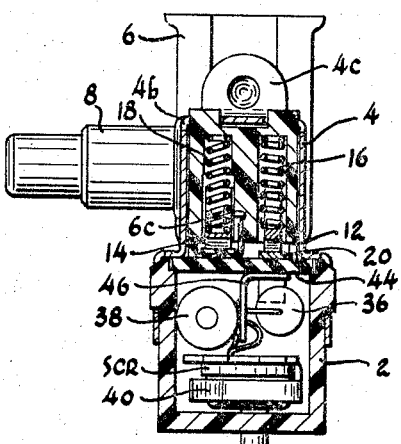
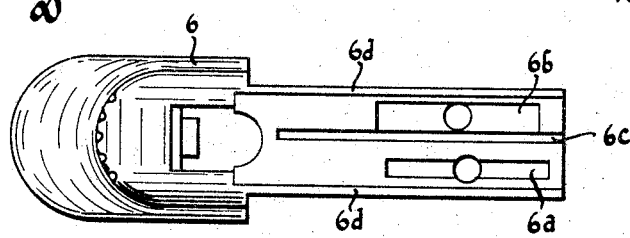
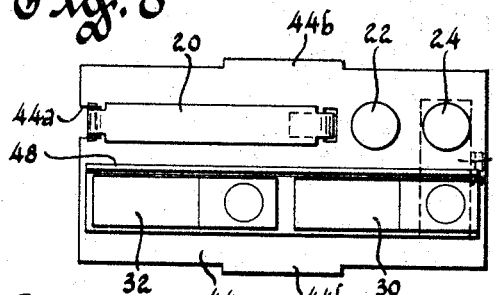
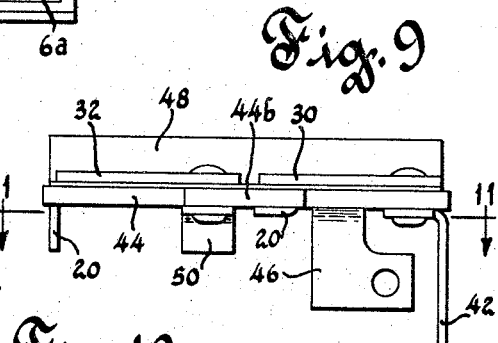
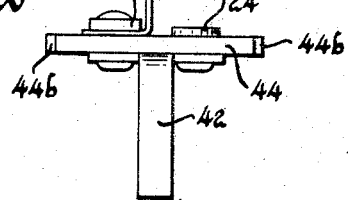
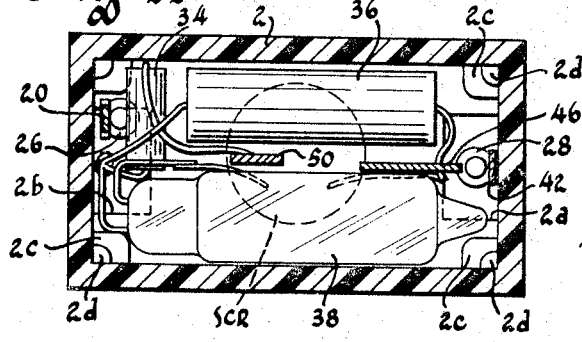
Inventor
Harry W. Brown
By Wm. A. Autio
Attorney July 4, 1967    H. W. BROWN    3,329,842
SPEED CONTROLLERS FOR PORTABLE DEVICES
Filed May 11, 1965    3 Sheets-Sheet 3
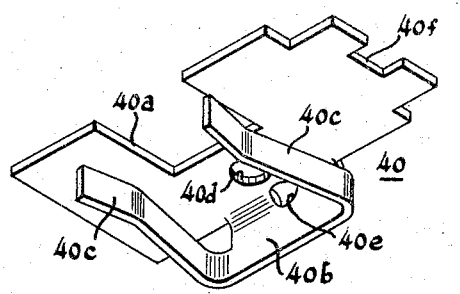
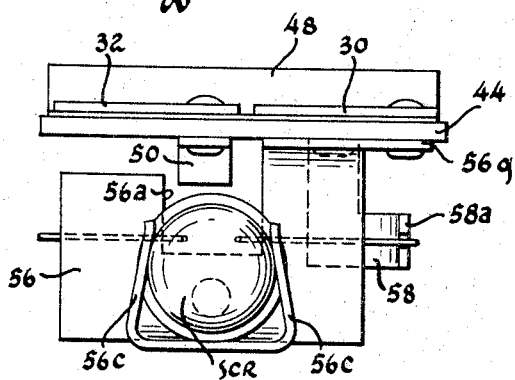
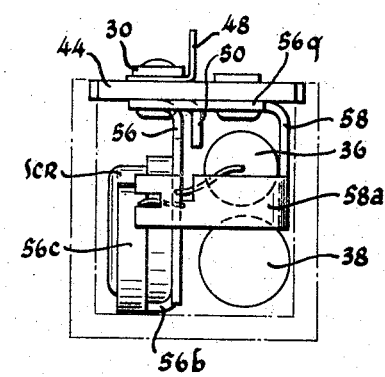
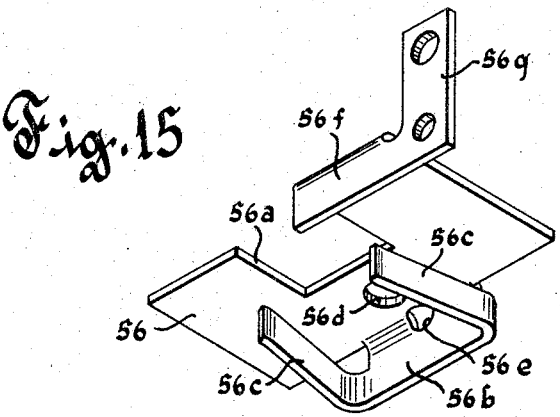

United States Patent Office

3,329,842
Patented July 4, 1967

3,329,842
SPEED CONTROLLERS FOR PORTABLE
DEVICES
Harry W. Brown, Big Bend, Wis., assignor to Cutler-Hammer, Inc., Milwaukee, Wis., a corporation of Delaware
Filed May 11, 1965, Ser. No. 454,808
12 Claims. (Cl. 310—68)

This invention relates to speed controllers for portable devices and more particularly to combined on-off switch and speed controller for an electric motor operated device.

While not limited thereto, the invention is especially applicable to controlling the operating speed of portable tools such as drills, sanders, saws, etc.

An object of the invention is to provide a speed control switch of improved construction.

A more specific object of the invention is to provide improved means for mounting a solid state, motor speed control system in the insulating housing of a trigger switch.

Other objects and advantages of the invention will hereinafter appear.

According to the invention, there are provided improved speed control switches for portable tools. Both the switch and the speed control circuit are housed within the insulating base of a trigger switch without any increase in size thereof. The speed control circuit comprises a silicon controlled rectifier (SCR) for adjustably controlling the magnitude of half-wave rectified current flow to a universal electrical motor. This silicon controlled rectifier together with its triggering circuit elements is mounted within the insulated housing of the trigger switch. The triggering control circuit elements comprise a neon lamp or breakover diode or the like for controlling triggering of the SCR, a capacitor for charging to fire the neon lamp or diode, and constant and variable resistors for controlling the timed charging of the capacitor. These elements of the speed control circuit other than the variable resistors are mounted, along with the heat sink for the SCR which may have various constructions, within the cavity in the insulating base. The open side of the base is closed by an insulating plate which supports the switch contacts, speed control variable resistors and connectors for connecting the elements of the device. The variable resistors lie flat on the insulating plate to prevent warpage. The movable bridging contacts of both the switch and potentiometer (variable resistors) are supported in the trigger and are separated from one another by an insulating barrier dividing the space between the insulating plate and the trigger to prevent switch arcing products from contaminating the variable resistors.

These and other objects and advantages of the invention and the matter of obtaining them will best be understood by reference to the following description of embodiments of a speed control switch taken in conjunction with the accompanying drawings, wherein:

FIGURE 1 is a top plan view of a speed control switch constructed in accordance with the invention;

FIG. 2 is a front elevational view of the speed control switch of FIG. 1;

FIG. 3 is partly schematic and partly diagrammatic illustration of the speed control circuit housed in the trigger switch base;

FIG. 4 is a cross-sectional view taken along line 4—4 of FIG. 1 showing the resistor strips;

FIG. 5 is a fragmentary cross-sectional view taken along line 5—5 of FIG. 1 showing the switch contacts;

FIG. 6 is a cross-sectional view taken along line 6—6 of FIG. 2;

FIG. 7 is a bottom view of the trigger with the movable contacts and springs removed therefrom;

FIG. 8 is a top plan view of the mounting plate subassembly;

FIG. 9 is a front elevational view of the mounting plate subassembly of FIG. 8;

FIG. 10 is an end view of the subassembly of FIGS. 8 and 9;

FIG. 11 is a top plan view of the speed control elements within the base;

FIG. 12 is an isometric view of the heat sink for the SCR of the switch of FIGS. 1 to 11;

FIG. 13 is a front elevational view of a modified subassembly including a mounting plate and heat sink;

FIG. 14 is an end view of the subassembly of FIG. 13; and

FIG. 15 is an isometric view of the heat sink of FIGS. 13 and 14.

Referring to FIGS. 1 and 2, there is shown a speed control trigger switch having an external appearance substantially similar to the trigger switch in R. E. Larkin Patent No. 2,988,724. The parts visible in FIGS. 1 and 2 comprise an insulating base 2, a switch frame 4 for securing a slidable trigger 6 to the base, a lock button 8 mounted on the switch frame and a helical compression spring 10 for biasing the trigger outwardly from the switch frame.

As shown in the system diagram in FIG. 3, trigger 6 is adapted to slidably actuate two movable bridging contacts 12 and 14 when it is depressed against the force of spring 10. Movable contact 12 is pressed against the stationary contacts by a helical compression spring 16. Movable contact 14 is pressed against the variable resistors by a helical compression spring 18. The stationary contacts comprise an elongated contact 20, an intermediate contact 22 and a shunting contact 24. Intermediate contact 22 is between and spaced from contact 24 and one end of contact 20, all three contacts being arranged in a straight line. The other end of elongated contact 20 is connected through a conductor 26 to power supply line L1. Contact 22 is connected to the cathode of the SCR and contact 24 is connected through a conductor 28 to the armature winding A of a universal motor UM, the other side of armature winding A being connected through field winding F to power supply line L2.

As shown in FIG. 3, movable contact 12 is of bridging type having two rounded contacting points at its ends. Movable contact 12 normally is pressed against elongated contact 20 at both contacting points when the trigger is not depressed. When the trigger is depressed a first amount, movable contact 12 will bridge contacts 20 and 22 to connect the motor in series with the SCR across the power source. When the trigger is pressed a second amount, movable contact 12 slides over stationary contact 22 and then bridges contacts 20 and 24 to connect the motor directly across the power source.

The range of trigger depression during the aforesaid second amount controls the motor speed as hereinafter described. As shown in FIG. 3, the other movable contact 14 has two rounded contacting points at its ends which are normally pressed against the unconnected ends of two resistors 30 and 32, respectively. Two variable resistors rather than only one are used to obtain a larger resistance change per unit distance of trigger movement because the distance that the trigger can be moved is limited. Resistor 30 is connected at its other end to contact 24 and to the anode of the SCR. Resistor 32 is connected at its other end through a constant resistor 34 and a capacitor 36 to the cathode of the SCR. The junction between capacitor 36 and resistor 34 is connected through a triggering control neon lamp 38 to the gate of the SCR to provide a discharge path for the capacitor.

As will be apparent in FIG. 3, a first amount of depression of the target to bridge contacts 20 and 22 starts the motor running at a slow speed. For this purpose, on each alternate half-cycle of the alternating current supply when line L2 is positive relative to line L1, control current flows through the motor and then through conductor 28, resistor 30, bridging contact 14, resistors 32 and 34, capacitor 36, switch contacts 22, 12 and 20 and conductor 26 to line L1. At the same time, positive anode voltage is applied to the SCR. This control current flow charges capacitor 36 at a timed rate determined by the amount of resistance in the circuit. If the trigger is depressed more to cause contact 14 to decrease the resistance in circuit, capacitor 36 charges faster on each alternate half-cycle of the supply voltage. This capacitor charging rate can be adjusted through the range of trigger movement starting when contact 12 first engages contact 22 and during the sliding of contact 12 on contact 22 up to the point where contact 12 engages contact 24.

When the voltage on capacitor 36 reaches a predetermined value equal to the breakdown or break-over voltage of the triggering control lamp, the lamp will be rendered conducting and will discharge the capacitor into the gate of the SCR. This pulse of capacitor discharge current in the gate-cathode circuit fires the SCR into conduction and the SCR will then continue conducting for the remainder of the half-cycle of positive anode voltage. This SCR will stop conducting when the positive anode current decreases to zero at the end of the half-cycle.

It will be apparent that when the trigger is pressed further to reduce the resistance, the capacitor will charge sooner to the lamp break-over voltage thereby to trigger the SCR earlier on positive half-cycles of anode voltage. This causes the motor to speed up since more electrical energy is now applied thereto.

On the other half-cycles when positive voltage is applied to the cathode of the SCR, the SCR will remain non-conductive as it blocks current in the reverse direction. Capacitor 32, however, will charge in the opposite direction by current flowing therethrough and through resistors 34 and 32, contact 14 and resistor 30. Such charging causes lamp 38 to discharge the capacitor through the SCR gate in the reverse direction, that is, to apply a positive current pulse in the cathode to gate direction. This reverse pulse will have no effect on the cathode-anode path of the SCR which will remain in its blocking state. The SCR will, however, allow cathode to gate current to flow to discharge the capacitor.

When the trigger is pressed in all the way, contact 12 will bridge contacts 20 and 24 to shunt the SCR effectively out of circuit. Full cycle alternating current power is now applied to the motor to obtain maximum speed. When the trigger is released, spring 10 returns it to its normal off position shown in FIG. 3 to stop the motor.

The manner in which the speed control circuit shown in FIG. 3 is enclosed in the trigger switch base which is no larger than the base shown in the aforementioned Larkin patent enclosing merely a switch and a connector will be described in connection with FIGS. 4 through 12. As shown in FIGS. 4–6 and 11, base 2 has the shape of a rectangular box open at the top and having two rectangular holes 2a and 2b in the bottom, one adjacent each end wall, from which insulated conductors 26 and 28 emerge. As will be apparent in FIG. 3, conductors 28 and 26 are adapted to connect the speed control switch to the motor and to line L1, respectively. As shown in FIG. 2, the corners on the outside of the base are cut away about halfway up from the bottom to provide grooves ending in undercut overhangs under which tabs of the metal frame are bent to secure the trigger to the base.

As shown in FIGS. 4–6, the SCR is soldered to a heat sink 40 which is the first element to be inserted into the bottom of the base. As shown more clearly in FIG. 12, the heat sink is formed from sheet metal and may be coated with tin to facilitate soldering of the SCR thereto. One edge of the flat upper portion of the heat sink has a large notch 40a cut therein to provide clearance for the cathode and gate leads of the SCR. The other edge opposite this notch is provided at about its center with a downwardly bent extension 40b which originally had two strips 40c extending in opposite directions therefrom and which have been bent substantially parallel to each other under the flat upper portion of the heat sink. As will be apparent, parallel strips 40c form a clamp for initially holding the SCR when it is being soldered to the lower surface of the upper flat portion. To facilitate soldering, the heat sink is provided with a hole 40d in its flat upper portion between notch 40a and extension 40b. Thus, the SCR is inserted between arms or strips 40c, with its cathode and gate leads projecting through slot 40a and solder is then introduced through hole 40d so that it flows between the surfaces of the SCR and heat sink. In known manner, the anode of the SCR is electrically connected to its metal case and therethrough to the heat sink so that the heat sink forms a terminal therefor.

Since the SCR has a sharp corner adjacent the bend in the heat sink, it normally would not fit snugly in the rounded inside corner of the heat sink formed by the bend. To avoid having to cut metal away from this rounded inside corner after the heat sink has been formed, a snug fit of the sharp corner of the SCR is afforded by punching a hole 40e in the heat sink blank at the point where the SCR will enter the inside corner.

The right-hand end of the flat upper portion of the heat sink is provided with a notch 40f at substantially its center and in alinement with a connector 42 suspended from an insulating mounting plate 44 hereinafter described into which notch the connector is soldered to form an electrical connection. As shown in FIG. 12, the corners of the heat sink forwardly and rearwardly of notch 40f are cut away to provide clearance for protrusions 2c within the corners of the base when the circuit subassembly is inserted in the base. As shown in FIGS. 5 and 11, the base is provided with larger protrusions 2c within the corners extending about halfway up from the bottom of the base and smaller protrusions 2d extending from the upper ends of protrusions 2c upwardly within a distance from the top edge of the base equal to the thickness of mounting plate 44. As will be apparent, protrusions 2c are caused by the external grooves into which the tabs of the switch frame are bent whereas protrusions 2d at their upper ends provide support for the corners of the mounting plate 44.

As shown in FIGS. 8 and 9, the speed control switch is provided with a mounting plate subassembly to which the circuit components and conductors are attached before it is inserted within the base. The subassembly comprises a row of stationary contacts mounted on the upper surface of one-half of mounting plate 44 and a pair of resistance strips mounted on the upper surface of the other half of the mounting plate with an insulating barrier therebetween. More specifically, stationary contact 20 which is in the form of a narrow strip lies along the upper surface of the mounting plate. The left-hand narrowed end of contact 20 is bent down through a notch 44a in the left-hand end of the mounting plate to form a connector below the mounting plate to which the bared end of conductor 26 is connected. The other narrowed end of contact 20 is bent down through a hole in the mounting plate and is bent back flat against the lower surface of the mounting plate to secure contact 20 rigidly thereto as shown in FIGS. 5, 8 and 9. Stationary contact 22 which is spaced from the right-hand end of contact 20 is in the form of a flat-head rivet whose shank extends through a hole in the mounting plate and is secured therebelow to a suspended connector 46 having a hole therein to which the cathode lead of the SCR and one lead of capacitor 36 are connected by soldering as shown in FIGS. 3, 6 and 11. Stationary contact 24 which is spaced toward the right from contact 22 is also in the form of a flat-head rivet whose shank extends down through a hole in the mounting plate and is secured therebelow to connector 42, this connector being also connected to resistor 30, to the anode of the SCR through heat sink 40 and through heat sink 40 to conductor 28 which leads to the motor as shown in FIGS. 3, 4 and 8.

On the other half of the upper surface of mounting plate 44 lies an insulating strip 48 bent along the middle of its longer dimension to an angle as shown in FIGS. 6, 8 and 9. This insulating strip which forms an arc barrier is made of pressed fiber or the like and one-half of it is bent to an angle of about 60 degrees from the other half so that it springs back to an angle of about 95 degrees from the other half thereof. That is, the arc barrier is provided with a bias tending to increase the angle between the halves thereof so that it will inherently hug the trigger and close the space between the contacts and resistors as hereinafter described.

Resistors 30 and 32 are in the form of flat strips, each having a resistance coating about two-thirds of the way from the left end and a silver connector coating for the remaining one-third of its upper surface and a rivet hole through this connector portion. These two resistor strips lie along the horizontal half of the arc barrier with their connectors at the right and in slightly spaced apart longitudinal alinement and are riveted to the mounted plate through the holes therein and through holes in the arc barrier and mounting plate. Resistor 30 is to the right of resistor 32 as seen in FIGS. 8 and 9. The rivet of resistor 30 also connects to connector 42 below the mounting plate, connector 42 being provided with a two-hole tab as shown in FIG. 8. The rivet of resistor 32 secures a short connector 50 in suspended relation at the lower surface of the mounting plate for connection to one lead of resistor 34 as shown in FIG. 11.

As shown in FIGS. 6 and 11, the other lead of resistor 34, the other lead of capacitor 36 and one lead of lamp 38 are connected together by soldering. The other lead of lamp 38 is connected to the gate lead of the SCR by soldering, this gate lead being the left-hand lead of the SCR as seen in FIG. 11. Conductor 26 is soldered or welded to the depending end of stationary contact 20 as shown in FIG. 5. Conductor 28 is soldered or welded to the heat sink for connection to the anode of the SCR as shown in FIG. 4.

With the aforementioned connections made, the subassembly shown in FIGS. 8–10 plus the lamp, capacitor, resistor and conductors are now ready to be housed in the base. The conductors are inserted through the holes in the bottom of the base and the subassembly is inserted in the base so that mounting plate 44 closes the open top thereof. As shown in FIG. 8, mounting plate 44 is provided with short projections 44b centrally of its two longer edges fitting into complementary grooves in the side walls of the base to support these portions of the mounting plate while the corners are supported by protrusions 2d hereinbefore described.

As shown in FIGS. 4 to 6, the trigger which is made of insulating material is provided with means accommodating two spring-biased bridging contacts 12 and 14 for engaging the stationary contacts and resistor strips, respectively, when the trigger is depressed. This means comprises a pair of spaced, parallel, narrow and elongated cavities 6a and 6b extending from the bottom of the trigger upwardly about halfway into the trigger. As shown in FIG. 7, the two cavities are about equal in length but cavity 6a for the switch contact is displaced slightly to the right relative to the resistor contact cavity 6b since contact 24 is to the right of the resistance coating portion of resistor 30 as shown in FIG. 8. Each such contact cavity has at its center a deeper round bore extending farther up into the trigger for retaining a helical compression spring. As shown in FIGS. 4 and 6, helical compression spring 18 biases bridging contact 14 downwardly against the resistor strips. In a similar manner, helical compression spring 16 shown in FIGS. 5 and 6 biases bridging contact 12 downwardly against switch contact 20.

Bridging contact 12 is made of a relatively thick solid flat piece of conducting material such as copper because it carries the motor current. As shown in FIG. 5, contact 12 has a slot extending partway down from its upper edge at the middle for retaining the lower end of compression spring 16. The lower edge of contact 12 is cut out at the center to provide a pair of contacting legs, one at each end for engaging common contact 20 and either contact 22 or 24. The cavity in the trigger is deep enough so that contact 12 can move resiliently up or down under the bias of the spring.

Bridging contact 14 is made of a relatively thin strip of conductive material such as bronze since it carries the relatively much smaller capacitor charging current. Contact 14 is formed into the shape of a shallow U as shown in FIG. 4 with its contacting portions at the ends depending and looped downwardly and being rounded for sliding contact with the flat upper surfaces of resistors 30 and 32. The midportion of contact 14 between the depending contacting portions is raised to clear the rivet head which secures resistor strip 32 to the mounting plate. Also, the center portion of contact 14 may be provided with a boss fitting into the lower end of helical spring 18 to keep the latter from sliding along the contact.

As shown in FIG. 7, the lower side of the trigger between cavities 6a and 6b is provided with a long channel or groove 6c for receiving the upstanding portion of the arc barrier. This groove 6c may communicate with cavity 6b which contains the resistors bridging contact. As seen in FIG. 6, the bias in the arc barrier presses it against the right-hand wall of groove 6c to close completely the space between the switch contacts and resistors 30 and 32. Depending skirts 6d on opposite sides of the trigger slide along plate 44 and also confine resistors 30 and 32 from turning on their rivets.

The helical biasing springs and bridging contacts are assembled in the cavities in the trigger, the trigger is placed in the switch frame so that upstanding projections 6e in the top of the trigger enter apertures 4b in the switch frame, return spring 10 is placed between the trigger and bracket 4c and the trigger and switch frame subassembly is then placed on the base and the tabs of the switch frame bent over to secure the parts together. Spring 10 is held in place by a boss on bracket 4c, this bracket being integral with the switch frame, and another boss or projection molded in the slot in the trigger, both of these bosses fitting within the ends of spring 10 as shown in FIG. 4.

FIGS. 13–15 show a modification of the speed control switch hereinbefore described. In this modification, parts like those in FIGS. 1–12 have been given like reference characters whereas new parts are identified by new numerals. This modification differs from that hereinbefore described in the arrangement of the parts within the base, this new arrangement being brought about by combining one of the connectors with the heat sink and by modifying another connector to facilitate soldering of the connections.

As shown in FIGS. 13 to 15, there is provided a modified heat sink 56 arranged vertically at one side of the cavity within the base. This heat sink is provided with a slot 56a in one edge of longest dimension, an extension 56b on the opposite edge bent to a 90 degree angle, parallel arms 56c for gripping the SCR, a hole 56d through which solder is introduced and a hole 56e at the bend like those in heat sink 40 of FIG. 12. In addition, the edge adjacent slot 56a has an extended portion 56f and is bent at 90 degrees in the same direction as extension 56b. One end of portion 56f is provided with a projection 56g in the same plane therewith but extending past the end of the heat sink flat portion. This projection 56g forms a connector and is provided with two holes for connection to the rivets of stationary contact 24 and resistor 30.

As shown in FIG. 14, connector portion 56g suspends the heat sink from mounting plate 44 and serves electrically to connect stationary contact 24 and resistor 30 to the anode of the SCR. As in FIG. 4, conductor 28, whereby the SCR is connected to the motor, may be soldered or welded to the heat sink.

Another difference in the modification of FIGS. 13–15 is that connector 46 has been replaced by a connector 58 which is not only re-oriented but is provided with a bent over portion 58a extending around the end of the capacitor. Connector 58 is riveted to contact 22 so that it is suspended along the side wall of the base within the cavity. The suspended portion of this connector extends in the right-hand direction in FIG. 13 toward the end of the base and terminates in portion 58a bent forwardly along the right end wall of the base around the end of capacitor 36 as shown in FIGS. 13 and 14.

As will be apparent, in this modification of assembly, lamp 38 lies in the bottom of the cavity within the base alongside the heat sink mounted SCR and capacitor 36 overlies lamp 38. Bent-over portion 58a is provided with a pair of slots or notches in its edges to facilitate soldering of the SCR cathode and capacitor leads thereto.

It will be apparent from the foregoing description of the structure of the speed control switch that there are a combination of novel features providing an improved device. A plurality of variable speed control resistors are provided to afford sufficient resistance variation in the trigger movement available. These variable speed control resistors are physically separate and and individually secured flat on the upper surface of the mounting plate to avoid stringent manufacturing tolerances and to provide a long lasting structure without warpage. The movable bridging contacts are given configurations affording ease of assembly to the bias springs and within their cavities. The SCR is provided with an improved heat sink to which it is soldered affording use of a hermetically sealed SCR rather than one that is open to contamination. An arc barrier is placed between the switch contacts and the variable resistors and is constructed and arranged so that it is secured by the same rivets that secure the resistance strips and is provided with self-bias to maintain the space between the contacts and resistors completely closed. And the arrangement of the parts with respect to the mounting plate and connectors facilitates assembly.

While the apparatus hereinbefore described is effectively adapted to fulfill the objects stated, it is to be understood that I do not intend to confine my invention to the particular preferred embodiments of speed controllers for portable devices disclosed, inasmuch as they are susceptible of various modifications without departing from the scope of the appended claims.

I claim:

1. In an electric motor operated portable tool connectable to an electric power source and having a hand grip including an opening therein for an operating trigger; a speed control switch comprising:
   an insulating base having an open top cavity therein;
   elements of a motor speed control circuit mounted within said cavity;
   an insulating plate at the top of said cavity and having electrical connectors thereon connecting said motor speed control elements in circuit and to a pair of conductors extending through openings in the base and adapted for connecting said circuit to a power source and a motor;
   an operating trigger and a frame clamping said trigger for sliding movement over said mounting plate;
   adjustable resistance means on the upper surface of said plate between said trigger and said plate;
   switch means on the upper surface of said plate between said trigger and said plate;
   means extending through said plate for connecting said resistance means and said switch means to said connectors therebelow;
   contacts movable with said trigger;
   spring means biasing said contacts against said resistance means and said switch means to effect operation and speed adjustment of the motor when the trigger is depressed;
   and an insulating barrier between said adjustable resistance means and said switch means to prevent switch arcing products from contaminating said adjustable resistance means.

2. In an electric motor operated portable tool connectable to an electric power source and having a hand grip including an opening therein for an operating trigger; a speed control device comprising:
   an insulating base having an open-top cavity therein;
   elements of a motor speed control circuit mounted within said cavity;
   an insulating plate at the top of said cavity and having electrical connectors thereon connecting said motor speed control elements in circuit and to a pair of conductors extending through openings in the base and adapted for connecting said circuit to a power source and a motor;
   an operating trigger and a frame clamping said trigger for sliding movement over said mounting plate;
   adjustable resistance means lying flat on the upper surface of said plate between said trigger and said plate;
   switch means on the upper surface of said plate between said trigger and said plate;
   means extending through said plate for connecting said resistance means and said switch means to said connectors therebelow;
   contacts movable with said trigger;
   and spring means biasing said contacts against said resistance means and said switch means to effect operation and speed adjustment of the motor when the trigger is depressed.

3. The invention defined in claim 2, wherein said adjustable resistance means comprises:
   two ribbon-like strips having electrical resistance material thereon and arranged longitudinally in spaced apart relation and rigidly secured flat along the upper surface of said mounting plate by said connecting means;
   and one of said contacts comprising a bridging contact slidable by said trigger along said resistance strips for adjusting their resistance values in the same direction thereby to afford a larger resistance change per unit of bridging contact travel.

4. The invention defined in claim 2, together with:
   an insulating barrier secured to the upper surface of said mounting plate by some of said connecting means and having an elongated upstanding portion dividing the space between said mounting plate and said trigger to prevent switch arcing products from contaminating said adjustable resistance means.

5. The invention defined in claim 4, together with:
   an elongated groove in the lower surface of said trigger for accommodating the upper edge of said insulating barrier.

6. The invention defined in claim 5, wherein said insulating barrier comprises:
   a thin sheet bent along its longer dimension to provide a first portion lying flat against the upper surface of said mounting plate and an upstanding portion extending into said groove in said trigger;
   and said insulating sheet comprising material tending to cause it to straighten out at its bend whereby its upper edge is biased against one side of said groove in said trigger completely to close the space between said adjustable resistance means and said switch means.

7. The invention defined in claim 2, wherein said motor control circuit comprises:

a silicon controlled rectifier for controlling the motor speed;

and a heat sink within said cavity and having a flat heat dissipating portion and a pair of arms for gripping the silicon controlled rectifier to facilitate soldering thereof to said flat portion.

8. The invention defined in claim 7, wherein:

one of said connectors depending from said mounting plate is electrically connected to said heat sink whereby electrical connection is made to the anode of said silicon controlled rectifier.

9. The invention defined in claim 2, wherein one of said contacts comprises:

a bridging contact confined for vertical sliding movement in a slot in said trigger for bridging a pair of stationary contacts of said switch means when said trigger is depressed;

a bore deeper than said bridging contact slot and centrally thereof;

and a compression spring in said bore biasing said bridging contact against said stationary contacts.

10. The invention defined in claim 2, wherein said adjustable resistance means comprises:

a pair of stepless resistance strips lying flat on said mounting plate;

a substantially U-shaped bridging contact having a pair of spaced contacting portions engaging said strips and being confined for vertical sliding movement in a slot in said trigger;

and a compression spring biasing said U-shaped contact against said resistance strips.

11. The invention defined in claim 10, wherein said variable resistance means comprises:

a pair of resistance strips each riveted at one end to said mounting plate;

and skirts on said trigger slidable on said mounting plate and enclosing said resistance strips and said switch means therebetween;

one of said skirts restricting said resistance strips from turning on their rivets.

12. The invention defined in claim 7, wherein:

one of said connectors depending from said mounting plate is integral with and suspends said heat sink and the silicon controlled rectifier along one wall of said base, leaving space along the opposite wall thereof for the other motor speed control elements.

No references cited.

MILTON O. HIRSHFIELD, *Primary Examiner.*

L. L. SMITH, *Assistant Examiner.*